US010184596B2

(12) United States Patent
Liu et al.

(10) Patent No.: US 10,184,596 B2
(45) Date of Patent: Jan. 22, 2019

(54) CONNECTION STRUCTURE BETWEEN PIPE BODY AND JOINT OF ALUMINUM ALLOY DRILL PIPE

(71) Applicants: China National Petroleum Corporation, Beijing (CN); CNPC Tubular Goods Research Institute, Xi an, Shan Xi (CN)

(72) Inventors: Yonggang Liu, Beijing (CN); Fangpo Li, Beijing (CN); Qi Shi, Beijing (CN); Chun Feng, Beijing (CN)

(73) Assignees: CHINA NATIONAL PETROLEUM CORPORATION, Beijing (CN); CNPC TUBULAR GOODS RESEARCH INSTITUTE, Xi An (CN)

(*) Notice: Subject to any disclaimer, the term of this patent is extended or adjusted under 35 U.S.C. 154(b) by 394 days.

(21) Appl. No.: 14/933,325

(22) Filed: Nov. 5, 2015

(65) Prior Publication Data

US 2016/0160574 A1  Jun. 9, 2016

(30) Foreign Application Priority Data

Dec. 5, 2014 (CN) .......................... 2014 1 0738475

(51) Int. Cl.
*F16L 15/04* (2006.01)
*E21B 17/042* (2006.01)

(52) U.S. Cl.
CPC ............ *F16L 15/04* (2013.01); *E21B 17/042* (2013.01)

(58) Field of Classification Search
CPC ......... F16L 15/04; F16L 15/06; F16L 15/004; E21B 17/042; E21B 17/08
(Continued)

(56) References Cited

U.S. PATENT DOCUMENTS 3,682,256 A * 8/1972 Stuart
4,377,302 A   3/1983 Kohyama et al.
(Continued)

FOREIGN PATENT DOCUMENTS

CN   1902423 A    1/2007
CN   202300224 U  7/2012
(Continued)

OTHER PUBLICATIONS

International Search Report and English translation thereof for Russian Patent Application No. 2015148009 dated Aug. 8, 2016, 2 pages.

*Primary Examiner* — Greg Binda
*Assistant Examiner* — Zachary T Dragicevich
(74) *Attorney, Agent, or Firm* — Hoffman Warnick LLC

(57) ABSTRACT

A connection structure between a pipe body and a joint of an aluminum alloy drill pipe comprises a first joint portion located at an end of the aluminum alloy pipe body and a second joint portion, wherein the first joint portion comprises an external cone section, an external threaded section and a first seal end face sequentially provided from inside to outside thereof, and a taper of the external cone section is smaller than that of the external threaded section; wherein the second joint portion is cylindrical and comprises an internal cone section fitted with the external cone section, an internal threaded section fitted with the external threaded section, a second seal end face, an elevator shoulder face, and a concave arc transition section between the internal cone section and the internal threaded section.

8 Claims, 2 Drawing Sheets

(58) Field of Classification Search
USPC .................................................. 285/333, 334
See application file for complete search history.

(56) References Cited

U.S. PATENT DOCUMENTS

| | | | | |
|---|---|---|---|---|
| 6,347,814 B1 * | 2/2002 | Cerruti | ................... | E21B 17/08 |
| | | | | 285/333 X |
| 6,442,826 B1 * | 9/2002 | Staudt | ................... | F16L 15/004 |
| 6,478,344 B2 * | 11/2002 | Pallini, Jr. | ............. | E21B 17/042 |
| | | | | 285/333 |
| 6,811,189 B1 * | 11/2004 | DeLange | ................... | 285/333 X |
| 2004/0251686 A1 | 12/2004 | Otten et al. | | |
| 2006/0006600 A1 | 1/2006 | Roussie | | |
| 2006/0162145 A1 | 7/2006 | Verger et al. | | |
| 2009/0200798 A1 | 8/2009 | Hamamoto et al. | | |
| 2012/0175846 A1 | 7/2012 | Hedrick | | |
| 2012/0286507 A1 * | 11/2012 | Maillon | ................ | E21B 17/042 |
| | | | | 285/334 |

FOREIGN PATENT DOCUMENTS

| | | |
|---|---|---|
| CN | 202718631 U | 2/2013 |
| CN | 203403831 U | 1/2014 |
| DE | 3207237 A1 | 6/1984 |
| RU | 2306473 C2 | 8/2003 |

\* cited by examiner

CONNECTION STRUCTURE BETWEEN PIPE BODY AND JOINT OF ALUMINUM ALLOY DRILL PIPE

This application claims priority to Chinese Patent Application No. 201410738475.0, filed on Dec. 5, 2014 before the State Intellectual Property Office of the P.R.C, which is hereby incorporated by reference in its entirety.

TECHNICAL FIELD

The present disclosure relates to a connection between a pipe body and a joint, and particularly, to a connection structure between a pipe body and a joint of an aluminum alloy drill pipe.

BACKGROUND

The aluminum alloy drill pipe has advantages and characteristics such as light dead weight, high mass strength ratio, and anti-fatigue. With the application of special process wells such as super-deep wells, super-long horizontal wells and super-long extended reach wells, and the popularization of downhole power drilling tools, the aluminum alloy drill pipe is used more and more widely. According to related data statistics, in recent years, in the exploration and development of oil and gas resources in Russia, the aluminum alloy drill pipe is used in 70% of wells.

SUMMARY

A connection structure between a pipe body and a joint of an aluminum alloy drill pipe, comprising a first joint portion located at the end of an aluminum alloy pipe body and a second joint portion located at an end of the joint, wherein the first joint portion comprises an external cone section, an external threaded section and a first seal end face sequentially provided from inside to outside thereof, the external threaded section is a cone threaded section, and a taper of the external cone section is smaller than that of the external threaded section; wherein the second joint portion is cylindrical and comprises an internal cone section, an internal threaded section and a second seal end face sequentially fitted with the first joint portion; the cylindrical second joint portion comprises a concave arc transition section provided between the internal cone section and the internal threaded section for adapting to the plastic deformation of the internal cone section, and an elevator shoulder face provided outside the second joint portion at the same axial position as the concave arc transition section; and wherein when the first joint portion and the second joint portion are connected to each other, the internal cone section is plastically deformed to be expanded, and the concave arc transition section is plastically elongated to compensate for the deformation of the internal cone section, so that a thread connection between the internal threaded section and the external threaded section is not influenced by the deformation of the internal cone section; and when a screwing-on torque reaches an expected value, the first seal end face and the second seal end face contact each other to generate an expected contact pressure.

BRIEF DESCRIPTION OF THE DRAWINGS

The present disclosure will be further described in detail with reference to the drawings.

LIST OF REFERENCE SIGNS

Figure 1:
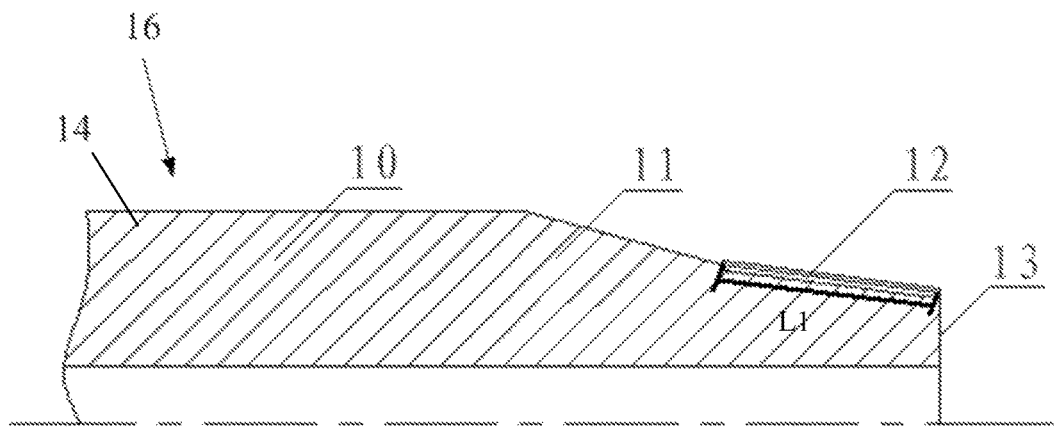
FIG. 1 is a structural diagram of a first joint portion according to an embodiment of a connection structure between a pipe body and a joint of an aluminum alloy drill pipe in the present disclosure.

10. First Joint Portion, 11. External Cone Section, 12. External Threaded Section, 13. First Seal End Face, 14. Pipe Body, 16. Aluminum Alloy Drill Pipe, 20. Second Joint Portion, 210. Concave Arc Transition Section, 21. Internal Cone Section, 22. Internal Threaded Section, 23. Second Seal End Face, 24. Gripping Shoulder Face.

DESCRIPTION OF EMBODIMENTS

Currently, the aluminum alloy drill pipe has two types of structures. One is an all aluminum alloy drill pipe completely made of aluminum alloy material. The other is an aluminum alloy drill pipe with a steel joint, i.e., the pipe body is made of aluminum alloy material while the joint is made of carbon steel, wherein the aluminum alloy pipe body is in threaded connection with the steel joint mainly in the manner of hot assembly. In other words, when the pipe body is to be connected to the joint, firstly the steel joint is heated to expand, and then the heated steel joint is in threaded connection with the aluminum alloy pipe body. After the steel joint is cooled, an interference fit is formed for the threaded connection between the joint and the pipe body through an effect of heat-expansion and cold-contraction of the steel, and the screwing-off torque between the aluminum alloy pipe body and the steel joint is far larger than the screwing-on torque and the working torque therebetween, so that any back-off or loosening of the aluminum alloy drill pipe will never occur in the service process. Alternatively, the aluminum alloy pipe body of the drill pipe may be cooled firstly, and then the cooled pipe body is connected to the steel joint. This principle is the same as the principle that heats the steel joint and connects it to the aluminum alloy pipe body, both for achieving an interference fit between the steel joint and the pipe body after the connection through heat-expansion and cold-contraction of the materials, so as to obtain higher screwing-off torque as well as connection strength and sealing strength between the aluminum alloy pipe body and the steel joint.

Either the cold assembly or the hot assembly requires special facilities to heat the joint or cool the pipe body. In addition, either the steel joint or the aluminum alloy pipe body requires a high or low temperature state during the assembly. Thus the efficiency of the assembly process is not high.

In order to solve the problem in the prior art that special heating or cooling facilities are required during the hot or cold assembly of the aluminum alloy pipe body of the drill pipe and the joint, and also overcome the technical deficiencies of high assembly cost and low assembly efficiency caused in the assembly under high or low temperature, the present disclosure provides a connection structure between a pipe body and a joint of an aluminum alloy drill pipe, so that the pipe body and the joint of the aluminum alloy drill pipe are assembled under the room temperature, and achieves the expected sealing property and connection strength between the pipe body and the joint.

The present disclosure adopts the following technical solution to solve its technical problem: a connection structure between a pipe body and a joint of an aluminum alloy drill pipe, comprising a first joint portion located at the end of an aluminum alloy pipe body and a second joint portion located at an end of the joint, wherein the first joint portion comprises an external cone section, an external threaded section and a first seal end face sequentially provided from inside to outside thereof, the external threaded section is a cone threaded section, and a taper of the external cone section is smaller than that of the external threaded section; wherein the second joint portion is cylindrical and comprises an internal cone section, an internal threaded section and a second seal end face sequentially fitted with the first joint portion; the cylindrical second joint portion comprises a concave arc transition section provided between the internal cone section and the internal threaded section for adapting to the plastic deformation of the internal cone section, and an elevator shoulder face provided outside the second joint portion at the same axial position as the concave arc transition section; and wherein when the first joint portion and the second joint portion are connected to each other, the internal cone section is plastically deformed to be expanded, and the concave arc transition section is plastically elongated to compensate for the deformation of the internal cone section, so that a thread connection between the internal threaded section and the external threaded section is not influenced by the deformation of the internal cone section; and when a screwing-on torque reaches an expected value, the first seal end face and the second seal end face contact each other to generate an expected contact pressure.

In one embodiment, an amount of interference between the external cone section and the internal cone section may be 0.08 mm to 0.12 mm, and threads of the external threaded section may be matched with those of the internal threaded section.

In one embodiment, a concave arc of the concave arc transition section may have a radius R of 10 mm, and the elevator shoulder face may have a radial thickness D of 8 mm.

In one embodiment, the concave arc transition section may be provided between the internal cone section and the internal threaded section, and an arc of the concave arc transition section may open toward an axis of the second joint portion.

In one embodiment, tapers of both the external cone section and the internal cone section may be 1:10.

In one embodiment, tapers of both the external threaded section and the internal threaded section may be 1:8.

In one embodiment, a length of the external threaded section may be equal to that of the internal threaded section.

In one embodiment, the external threaded section may be provided at an upper bottom thereof with a first seal end face, and the internal threaded section may be provided at an upper bottom thereof with a second seal end face which abuts against and is fitted with the first seal end face.

The present disclosure has the following beneficial effect: when the first joint portion and the second joint portion are connected to each other, since the wall thickness of the internal cone section is far smaller than that of the external cone section, the radial stress between the external cone section and the internal cone section exceeds beyond the yield strength of the joint portion material, so that the internal cone section is plastically deformed to be expanded, and a large static friction force is generated between the internal cone section and the external cone section, thereby achieving the purpose of increasing the screwing-off torque and the sealing property. The concave arc transition section between the internal cone section and the internal threaded section of the second joint portion is deformed to be elongated, which compensates for the plastic deformation of the internal cone section, and ensures that the threaded engagement of the internal threaded section is not influenced by the expanded deformation of the internal cone section. The first seal end face and the second seal end face are pushed against and fitted with each other during the assembly to generate a contact pressure at the end faces to realize the sealed connection between the first joint portion and the second joint portion, and achieve the expected sealing property between the aluminum alloy pipe body of the drill pipe and the joint. Meanwhile, the elevator shoulder face is designed so as to enable the drilling pipe to be pulled out of hole and run in hole, but also reduce the wall thickness of the internal cone to facilitate the plastic deformation of the internal cone section. The connection structure enables the pipe body and the joint of the aluminum alloy drill pipe to be assembled under the room temperature, and achieves the expected sealing property and connection strength between the pipe body and the joint, thereby overcoming the problem in the prior art that special heating or cooling facilities are required during the hot or cold assembly of the pipe body of the aluminum alloy drill pipe and the joint, and also overcoming the technical deficiencies of high assembly cost and low assembly efficiency caused in the assembly under a high or low temperature.

In order to understand the technical features, objects and effects of the present disclosure more clearly, the embodiments of the present disclosure are now described with reference to the drawings.

Figure 2:
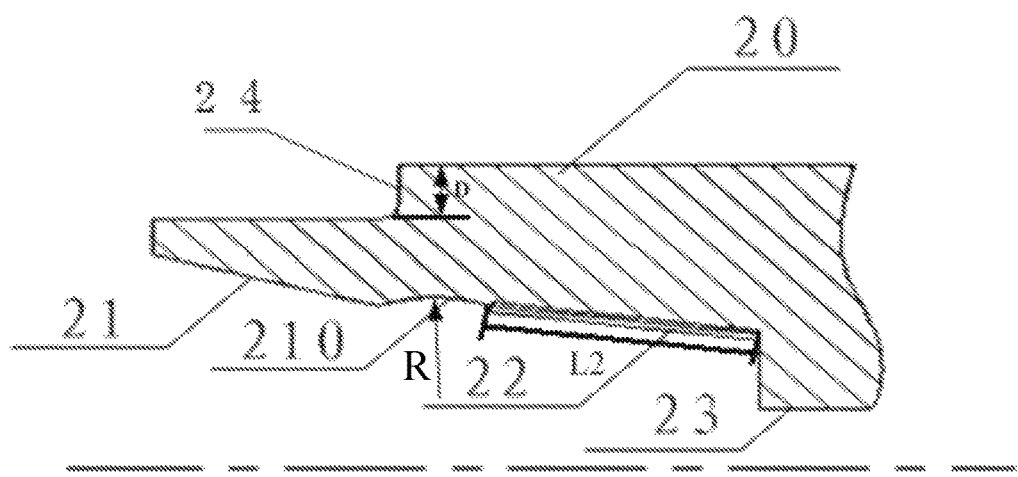
FIG. 2 is a structural diagram of a second joint portion according to an embodiment of a connection structure between a pipe body and a joint of an aluminum alloy drill pipe in the present disclosure.

As shown in FIGS. 1 and 2, the present disclosure proposes a connection structure between a pipe body 14 and a joint of an aluminum alloy drill pipe 16, comprising a first joint portion 10 located at an end of the aluminum alloy pipe body 14 and a second joint portion 20 located at an end of the joint. The first joint portion 10 comprises an external cone section 11, an external threaded section 12, and a first seal end face 13 sequentially provided from inside to outside thereof, the external threaded section 12 is a cone threaded section, and a taper of the external cone section 11 is smaller than that of the external threaded section 12. The cylindrical second joint portion 20 is cylindrical and comprises an internal cone section 21, an internal threaded section 22 and a second seal end face 23 sequentially fitted with the first joint portion 10. The second joint portion 20 comprises a concave arc transition section 210 provided between the internal cone section and the internal threaded section for adapting to the plastic deformation of the internal cone section, and an elevator shoulder 24 provided outside thereof at the same axial position as the concave arc transition section 210 for lifting the drilling pipe.

Figure 3:
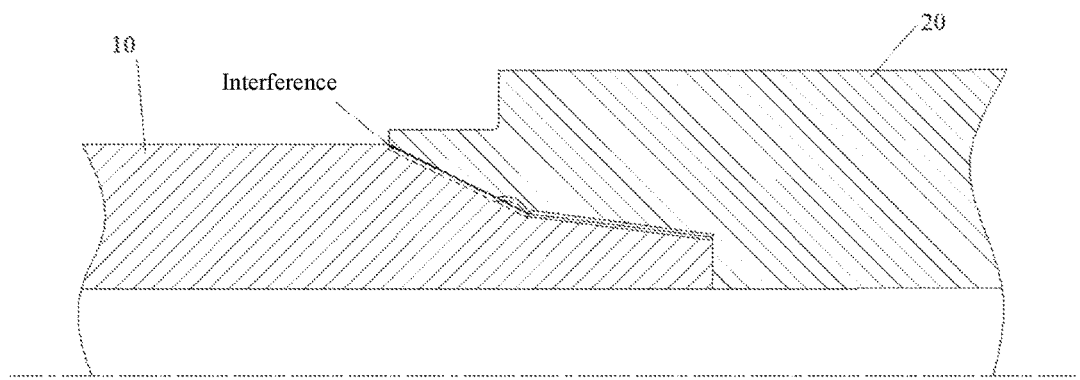
FIG. 3 is a structural diagram of the interface of a first joint and a second joint.

As to the connection structure between the pipe body 14 and the joint of the aluminum alloy drill pipe 16 in the present disclosure, when the first joint portion 10 and the second joint portion 20 are connected to each other as shown in FIG. 3, since a wall thickness of the internal cone section 21 is far smaller than that of the external cone section 11, the radial stress between the external cone section 11 and the internal cone section 21 exceeds beyond the yield strength of the material of the joint portion, so that the internal cone section 21 is plastically deformed to be expanded, and a large static friction force is generated between the internal cone section 21 and the external cone section 12, thereby achieving the purpose of increasing the screwing-off torque and the sealing property. The concave arc transition section of the second joint portion is deformed in the radial and axial directions to be elongated (i.e., when the internal cone section 21 is plastically deformed to be expanded, the concave arc transition section 210 is plastically deformed in the radial and axial directions to be elongated), which compensates for the plastic deformation of the internal cone section, and ensures that the threaded engagement between the internal threaded section 22 and the external threaded section 12 is not influenced by the expanded deformation of the internal cone section. The first seal end face and the second seal end face are pushed against each other during the assembly to generate a contact pressure at the end faces to realize the sealed connection between the first joint portion and the second joint portion. The elevator shoulder face on the second pipe body is designed so as to not only enable the drilling string to be pulled out of hole and run in hole, but also reduce the wall thickness of the internal cone section. The structure enables the pipe body 14 of the aluminum alloy drill pipe 16 and the joint to be assembled under the room temperature, and achieves the expected sealing property and connection strength between the pipe body 14 and the joint, thereby overcoming the problem in the prior art that special heating or cooling facilities are required during the hot or cold assembly of the pipe body 14 of the aluminum alloy drill pipe 16 and the joint, and also overcoming the technical deficiencies of high assembly cost and low assembly efficiency caused in the assembly under a high or low temperature.

In an embodiment, a length of the external cone section 11 and the internal cone section 21 is 6 mm to 10 mm, tapers of both the external cone section 11 and the internal cone section 21 are 1:10, and a wall thickness at the end face of the internal cone section 21 is 2 mm to 3 mm. During the assembly, an amount of interference between the external cone section 11 and the internal cone section 21 is 0.08 mm to 0.12 mm, and threads of the external threaded section 12 are matched with those of the internal threaded section 22.

Preferably, a concave arc transition section 210 is provided between the internal cone section 21 and the internal threaded section 22, a concave arc radius R of the concave arc transition section 210 is 9 mm to 11 mm, and the concave arc of the concave arc transition section 210 opens toward an axis of the second joint portion 20, which helps to compensate for the plastic expanded deformation of the internal cone section 21, without influencing the sealing property or the connection strength between the external threaded section 12 and the internal threaded section 22.

In this embodiment, a radial thickness D of the elevator shoulder face 24 is 7 mm to 9 mm. The elevator shoulder face is designed such that the wall thickness of the internal cone section is far smaller than that of the external cone section, and the internal cone section is plastically deformed to be expanded, so that the screwing-off torque between the joint portions is much larger than the screwing-up torque therebetween. The concave arc transition section of the second joint portion is deformed to be elongated, which effectively compensates for the plastic deformation of the internal cone section, prevents the threaded engagement of the internal threaded section from being influenced by the expanded deformation of the internal cone section, and ensures the connection strength and the sealing property of the threaded connection.

In this embodiment, tapers of both the external cone section 11 and the internal cone section 21 are 1:10, and a length L1 of the external threaded section 12 is equal to a length L2 that of the internal threaded section 22.

In this embodiment, the end face of the external threaded section 12 is provided with a first seal end face 13, and the end face of the internal threaded section 22 is provided with a second seal end face 23 fitted with the first seal end face 13. During the assembly, first seal end face 13 and the second seal end face 23 are pushed against and fitted with each other to generate a contact pressure at the end faces, thereby realizing the sealed connection between the first joint portion 10 and the second joint portion 20.

The assembly process of the present disclosure is exemplarily described as follows: the second joint portion 20 is inserted from an entry end of the first joint portion 10, so that the internal threaded section 22 and the external threaded section 12 are fitted with each other; the second joint portion 20 is screwed so that the second joint portion 20 extends into a set position of the first joint portion 10, and the first seal end face 13 abuts against the second seal end face 23. During the screwing process, the internal cone section 21 is deformed to be expanded. Experiments show that in the embodiment of the present disclosure, the screwing-off torque is 1.5 to 2 times more than the screwing-on torque.

The above description is merely to illustrate exemplary embodiments of the present disclosure, and cannot be used to limit the scope of the present disclosure. Any equivalent change or modification made by a person skilled in the art without deviating from the conception and principle of the present disclosure shall fall within the protection scope of the present disclosure. To be noted, the components of the present disclosure are not limited to the above integral application. As to the technical features described in the Description, a single one or a combination of them may be used according to actual needs. Therefore, the present disclosure certainly covers other combinations and specific applications related to the inventive ideas.

What is claimed is:

1. A connection structure between a pipe body and a joint of an aluminum alloy drill pipe, comprising a first joint portion located at an end of the pipe body and a second joint portion located at an end of the joint, wherein the first joint portion comprises an external cone section, an external threaded section and a first seal end face sequentially provided from inside to outside thereof, the external threaded section is a cone threaded section, and a taper of the external cone section is smaller than that of the external threaded section;

wherein the second joint portion is cylindrical and comprises an internal cone section, an internal threaded section and a second seal end face sequentially fitted with the first joint portion; the cylindrical second joint portion comprises a concave arc transition section provided between the internal cone section and the internal threaded section for adapting to plastic deformation of the internal cone section, and an elevator shoulder face provided outside the second joint portion at the same axial position as the concave arc transition section, so that the internal cone section has a reduced thickness with an outer surface of the internal cone section being radially inward relative to a remaining outer surface of the second joint portion; and when the first joint portion and the second portion are connected to each other, the internal cone section is plastically deformed to be expanded, and the concave arc transition section is plastically elongated to compensate for the deformation of the internal cone section, so that a thread connection between the internal threaded section and the external threaded section is not influenced by the deformation of the internal cone section; and when a screwing-on torque reaches an expected value, the first seal end face and the second seal end face contact each other to generate an expected contact pressure, wherein the internal cone section being plastically deformed to be expanded is due to a wall thickness of the internal cone section being far smaller than that of the external cone section, a radial stress between the external cone section and the internal cone section exceeds a yield strength of a material of the second joint portion, and thus a large static friction force is generated between the internal cone section and the external cone section, thereby achieving a purpose of increasing a screwing-off torque and sealing property.

2. The connection structure between the pipe body and the joint of the aluminum alloy drill pipe according to claim 1, wherein an amount of interference between the external cone section and the internal cone section is 0.08 mm to 0.12 mm, and threads of the external threaded section (12) are matched with those of the internal threaded section.

3. The connection structure between the pipe body and the joint of the aluminum alloy drill pipe according to claim 1, wherein a concave arc of the concave arc transition section has a radius of 10 mm.

4. The connection structure between the pipe body and the joint of the aluminum alloy drill pipe according to claim 1, wherein the elevator shoulder face has a radial thickness of 8 mm.

5. The connection structure between the pipe body and the joint of the aluminum alloy drill pipe according to claim 1, wherein an arc of the concave arc transition section opens toward an axis of the second joint portion.

6. The connection structure between the pipe body and the joint of the aluminum alloy drill pipe according to claim 1, wherein tapers of both the external cone section and the internal cone section are 1:10.

7. The connection structure between the pipe body and the joint of the aluminum alloy drill pipe according to claim 1, wherein tapers of both the external threaded section and the internal threaded section are 1:8.

8. The connection structure between the pipe body and the joint of the aluminum alloy drill pipe according to claim 1, wherein a length of the external threaded section is equal to that of the internal threaded section.

* * * * *